United States Patent
Uchino

(10) Patent No.: US 7,359,076 B2
(45) Date of Patent: Apr. 15, 2008

(54) DOCUMENT SHARING SERVICE FOR NETWORK PRINTING

(75) Inventor: Atsushi Uchino, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1134 days.

(21) Appl. No.: 10/404,385

(22) Filed: Apr. 1, 2003

(65) Prior Publication Data

US 2004/0196491 A1    Oct. 7, 2004

(51) Int. Cl.
*G06K 15/00* (2006.01)
*G06F 12/00* (2006.01)
*G06F 15/16* (2006.01)

(52) U.S. Cl. .............. 358/1.15; 358/1.18; 709/203; 707/204

(58) Field of Classification Search ......... 358/1.15, 358/1.16, 524, 402, 403, 1.18, 1.9; 707/204, 707/9, 10, 205; 709/203, 205, 214, 216, 709/219, 225, 226; 711/161, 163, 164
See application file for complete search history.

(56) References Cited

U.S. PATENT DOCUMENTS

| | | | |
|---|---|---|---|
| 5,946,458 A | 8/1999 | Austin et al. | |
| 6,092,104 A | 7/2000 | Kelly | |
| 6,160,631 A | 12/2000 | Okimoto et al. | |
| 6,213,703 B1 | 4/2001 | Garrido | |
| 6,469,796 B1 * | 10/2002 | Leiman et al. | 358/1.15 |
| 6,606,162 B1 * | 8/2003 | Simpson | 358/1.15 |
| 6,757,070 B1 * | 6/2004 | Lin et al. | 358/1.1 |
| 7,136,174 B2 * | 11/2006 | Chapin et al. | 358/1.13 |
| 2002/0054573 A1 * | 5/2002 | Bengtsson et al. | 370/254 |
| 2002/0063892 A1 * | 5/2002 | Tsukada | 358/1.15 |
| 2002/0085228 A1 * | 7/2002 | Yagita | 358/1.15 |
| 2002/0171856 A1 * | 11/2002 | Ackerman et al. | 358/1.13 |
| 2002/0196460 A1 * | 12/2002 | Parry | 358/1.15 |
| 2003/0011813 A1 * | 1/2003 | Peter et al. | 358/1.15 |
| 2003/0200289 A1 * | 10/2003 | Kemp et al. | 709/221 |

* cited by examiner

*Primary Examiner*—Jerome Grant, II
(74) *Attorney, Agent, or Firm*—Rosalio Haro

(57) ABSTRACT

An internet accessible server permits access management to remote printing devices by remote users. Only users having printing access to a target remote printing device may submit a print job for printing on the target remote printing device. Users having printing access permission are further divided into owner status and user status. Owner status user of a remote printing device may grant or revoke the printing permission of non-owner status users. At least one owner status user is designated a super-owner, and can grant and revoke the owner status of other users. The super-owner user may relinquish its super-owner status to any other user. After submitting a print job for a target printing device, the print job is stored in a storage space on the Internet and is transferred to the target printing device only when the target printing device itself downloads the print job using standard internet protocols similar to those used in the downloading of a web page.

30 Claims, 8 Drawing Sheets

NAME

ADDRESS

PAYMENT OPTION

| BILL X | CREDIT CARD | BANK DRAFT |

113, 115, 117

PROCEED  CANCEL
119      121

CREDIT CARD TYPE

| VISA | Master Card | ... | Other |

Card_1  Card_2       Card_n

CARD NUMBER        132

EXPIRATION DATE    133

SUBMIT    CANCEL
135       137

FIG. 12

DOCUMENT SHARING SERVICE FOR NETWORK PRINTING

BACKGROUND OF THE INVENTION

1. Field of the Invention

The present invention relates to an internet printing system and more specifically to a web-based system which enables a user to submit and control access of print job files over the internet, and provide user-specific management of a plurality of remote printing devices over the internet.

2. Description of the Related Art

Typically, when one desires to print data created by an application program, such as a word processing application running on a personal computer, one selects a print option provided by the application, which in turn initiates a printer driver interface. The printer driver interface typically provides a user with a list of locally available printing devices. These locally available printing devices may be physically and directly connected to the personal computer, such as through a serial or USB interface. Alternatively, the locally available printing devices may be coupled to the personal computer via a local LAN or WAN network. In either case, the range of choice of printing devices is limited by the need to remain locally available to the personal computer.

Recently, an alternate approach has been to provide printing services over the Internet to access remote network printing devices. Such systems often attempt to treat remote network printing devices as if they were a part of a local LAN or WAN network with some modifications due to the need to access the remote network printing device over the Internet. Therefore, the local network to which the personal computer is a part needs to have pre-existing knowledge of any remote network printing devices available over the internet and further needs to know the internet IP address of the remote network printing devices. The IP address is required since the print data generated on the personal computer is typically sent over the Internet directly to the remote network printing device, which is identified by its IP address. Therefore, it is often necessary that the remote network printing device maintain a fixed IP address. Furthermore, the remote network printing device necessarily needs to be accessible over the internet.

As it would be understood, the remote network printing device is often a part of a second remote LAN or WAN that has access to the Internet. Requiring that the remote network printing device have a fixed IP address and be accessible from the Internet places major restrictions on the management of the second remote LAN or WAN on which the remote network printing device is located. IP addresses that are valid and accessible over the internet of scarce and network managers typically try to share a valid IP address among multiple network machines by multiplexing their access to the Internet. Therefore, it is common that different network machines have their local IP address routinely reassigned to juggle local network and internet access. For example, a dynamic naming service, DNS, aids in the managing of a local network by routinely assigning a different local IP address to each local machine on the network, such that no single machine has a permanent local IP address. A name address translation, NAT, services permits multiple local network machines to share a single internet IP address by routinely assigning a different socket number to any local machine that wishes to access the internet. The socket number is attached to any data packet to and from the internet so that even if all machines share the same internet IP address, the NAT service can direct incoming the data packets to the appropriate local machine by use of the socket numbers. Since there are a limited number of available socket numbers, when a local machine breaks its connection to the internet, its socket number is effectively retrieved and made available to another machine.

Requiring that the second remote LAN or WAN maintain a fixed IP address for the remote network printing device limits the networks capability to manage its users.

Furthermore, it is generally considered bad network management to provide direct external access through the Internet to any machine internal to the network. Therefore, networked machines within a LAN or WAN are typically placed behind a firewall. A firewall is a machine that lies between a local network of machines and the internet, and its purpose to prevent unauthorized access of any local machine on the local network by any remote machine on the internet. Requiring that the remote network printing device on the LAN or WAN be accessible via the Internet means that the remote network printing device is not protected by the firewall and thus provides a possible open door through which a malicious individual may gain unauthorized access to the local network. Thus, network printers on a local network that might otherwise be accessible over the internet, are often located behind an internet firewall, are made subject to a DNS service, or are subject to a NAT service, and are thus made not accessible via the internet.

To summarize, since a remote user wishing to gain access to an internet printer needs to know the internet printer's IP address, and its assigned socket number, communication over the internet is complicated if the printer's IP address is subject to routine change due to a DNS or NAT services. Even if the remote user knows the IP address for accessing the internet printer, the remote user may be forbidden access to the local network on which the printer resides if the local network lies behind a firewall. Typically, to gain access to the internet printer on such a local network, the firewall needs to make an exception for the internet printer and permit direct access to the printer from the internet. However as stated before, this is not good security practice since it opens an unimpeded access path from the internet via the local printer to the local network, which makes the local network vulnerable to potential attack from the internet.

OBJECTS OF THE INVENTION

It is therefore an object of the present invention to provide an Internet printing system that does not require that a remote network printing device on a private LAN or WAN be externally accessible directly from the Internet and unprotected by a firewall.

Another object of the present invention to place no restrictions on the assignment of IP addresses on a remote network printing device.

A further object of the present invention is to provide an internet printing system wherein it is not necessary for a local personal computer (on local network on which the local personal computer resides) to have pre-existing knowledge of the IP address of a remote printing device in order to transmit over the Internet data for printing on the remote printing device.

SUMMARY OF THE INVENTION

The above objects are met in a system and method for facilitating the use of an internet accessible printer over the internet without increasing the vulnerability of the printer's local network.

The present invention addresses the above problems by use of a dedicated internet site acting as a liaison between the remote user and the local printer, and by incorporating additional functionality into a printer driver or print server.

The dedicated internet site serves three functions. First, the site functions as a Document Sharing Server and maintains a database of available remote printing devices, including their IP addresses and socket data. Secondly, it interacts with remote users on the internet to accept print jobs and maintain a correlation between submitted print jobs and their respective target printing devices. Third, it provides a regular web browser interface to any internet printing device, or print server, that accesses the Document Sharing Server. The accessing printing device, or print server, can inquire about any print jobs addressed to it and stored on the Document Sharing Server, and can download the print jobs in the same manner as downloading an Internet web page.

Three additional functions are added to the typical internet printing device or print server. First, the printing device needs to submit updated IP address information to the Document Sharing Server. Ideally, the printing should provide such information within regular time intervals. Secondly, the printing may access the Document Sharing Server website, log-in using a printer password and ID, and can "browse" the website to search for, and download, any print jobs waiting for it. Thirdly, the printer should be programmed to check the website at regular intervals since it is not automatically alerted to the existence of new print jobs on the Document Sharing Server.

Since the printing, or print server, manages the maintenance of its IP addressing information on the Document Sharing Server to assure that it remains current, the above problems regarding DNS and NAT are resolved. Additionally, since the remote user does not need to transmit print jobs directly to the local printer, there is no need for the firewall to make any access exceptions for the printing device on its local network. Lastly, since the printing device itself downloads a print job in the same manner as it downloads a web page, the transfer of the print job from the internet Document Sharing Server to the local printer is not hindered by the firewall.

BRIEF DESCRIPTION OF THE DRAWINGS

In the drawings, like reference symbols refer to like parts.

FIG. 11 is an exemplary electronic payment selection form in accord with the present invention.

FIG. 12 is an exemplary electronic charge card payment form in accord with the present invention.

DESCRIPTION OF THE PREFERRED EMBODIMENTS

Figure 1:
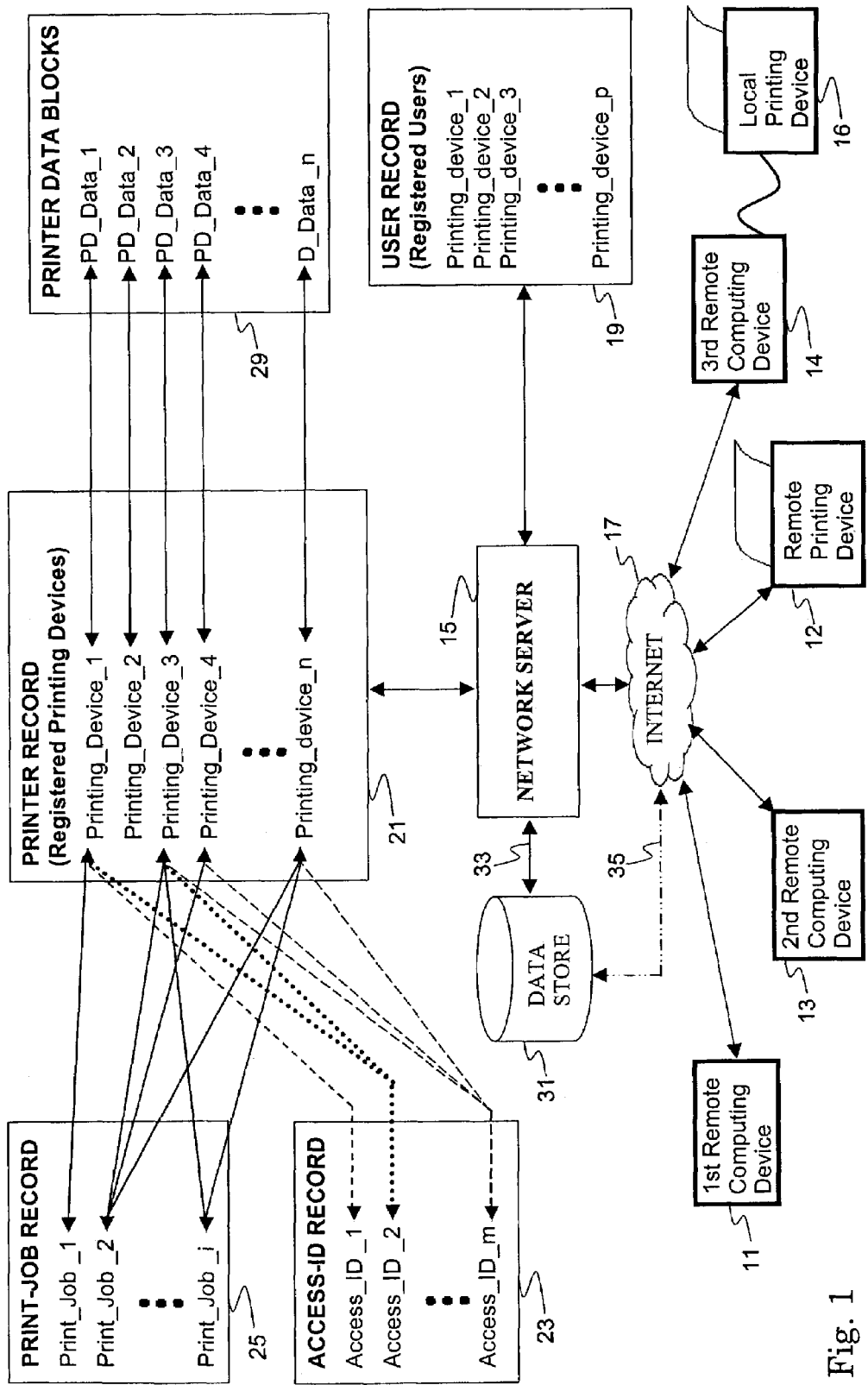
FIG. 1 is a block diagram of an internet printing system in accord with the present invention.

With reference to FIG. 1, an internet printing system in accord with a preferred embodiment of the present invention includes a first remote computing device 11 and a second remote computing device 13, both having communication access to a network server 15 through the Internet 17, sometimes referred to as the world wide web, WWW. The preferred system further includes a first remote printing device 12 having direct access to the Internet 17, and/or a second remote printing device 16 having indirect access to the Internet 17 via a third remote computing device 14. As it would be understood by one versed in the art, first 11, second 13 and third 14 computing devices may be selected form a list including, but not limited to, a personal computer, a computer network server, a personal computing device such as a personal digital assistance (PDA) or other handheld computing device, or any electronic device having network computing capability such as a mobile, or cellular, telephone. Alternatively either of first 11 or second 13 computing devices may be a network printer, but for the sake of clarity in the present example, only first remote printing device 12 is assumed to be a stand alone network printer. Therefore, first remote printing device 12 may in effect be considered a fourth remote computing device since in the present embodiment it is assumed to be a network printer having independent network communication access, as is more fully described below.

A remote printing device in accord with the present invention may therefore be embodied as first remote printing device 12 having an integrated network capability and having a computing capability for running various HTTP communication protocols and program routines. Alternatively, a remote printing device in accord with the present invention may be implemented as printing device 16 lacking integrated network access capability, but being directly linked to a computing device, such as third remote computing device 14, that may function as a network interface between printing device 16 and the Internet 17. Additionally, third remote computing device 14 may preferably provide other computing services such as running various HTTP and program routines to augment any lack of such capabilities in remote computing device 16. In other words, the hardware/software capability integrated into first remote computing device 12 for implementing the present invention may be provided within third remote computing device 14 as a service for second remote computing device 16.

Network server 15 includes a User Record 19 of registered users (each registered user being figuratively identified as registered_user_1 through registered_user_p), and a Printer Record 21 of registered remote printing devices (each registered remote printing device being figuratively identified as printing_device_1 through printing_device_n). It is to be understood that User Record 19 and Printer Record 21 may be organized in the form of a records data file, a structured database, tables, or other known data organization and retrieval systems. Network server 15 further maintains an Access-ID Record 23 of access identification codes (access_ID_1 through access_ID_m) and a Print-Job Record 25 of stored print jobs waiting to be printed (identified as print_job_1 through print_job_i). Associated with each printing device within Printer Record 21 is a corresponding block of printing device data, or group of printer data files, (PD_data_1 through PD_data_n), which may include such data as each printer's model type, printer driver, physical address location, registered owner, user permissions, TCP/IP network (IP) address, etc. The printing device data blocks (PD_data_1 through PD_data_n) are collectively identified as Printer Data Blocks 29 in FIG. 1.

For ease of illustration, User Record 19, Printer Record 21, Access-ID Record 23, Print-Job Record 25, and Printer Data Blocks 29 are shown as separate modules outside network server 15, but it is to be understood that all these modules may be integrated within network server 15. Alternatively, the modules may reside within additional computing devices, not shown, accessible by network server 15.

The print job files identified in Print-Job Record 25 are preferably stored in data store 31, which may be locally accessible by, or an integral part of, network server 15, as shown by bidirectional arrow 33. Alternatively, data store 31 may be remote from network server 15 and accessible via the Internet 17, as indicated by phantom lines 35. If data store 31 is accessible via the Internet 17, then record entries print_job_1 through print_job_i of Print-Job Record 25, each of which typically includes at least the name of its corresponding print job file in data store 31, would additionally include a URL (uniform resource locator) pointing to its corresponding print job file within data store 31. Thus, the URL would contain information not only identifying the network address of data store 31, but also a directory path within data store 31 leading directly to a specific target print job file within data store 31. Preferably, the print-job files within data store 31 are in the form of one of a journal file or a printer-driver-processed file. As it is known in the art, a journal file includes generic device driver requests that need to be converted into a printer-specific driver file for printing on a printing device. This printer specific driver file is identified herein as the printer-driver-processed file, and it includes drive data specific to a predefined printing device model or type.

As symbolically indicated by solid, double-headed arrows linking entries within Print-Job Record 25 with entries within Printer Record 21, each of print_job_1 through print_job_i is associated with at least one, and preferably more, of printing_device_1 through printing_device_n. The associating links indicate which printing device(s) (among printing_device_1 through printing_device_n) may access and print a corresponding print job among print_job_1 through print_job_i. For example, print_job_1 is shown associated by a single double-headed arrow to only printing_device_1, and thus may be printed only by the remote printing device identified as printing_device_1. By contrast, print_job_2 is shown associated to printing_device_3, printing_device_4, and printing_device_n by three double headed arrows. Thus, print_job_2 may be printed by any of printing_device_3, printing_device_4, and/or printing_device_n. Similarly, print_job_i is associated with printing_device_3 and printing_device_n. Thus, print_job_i may be printed by printing_device_3 and/or printing_device_n. Printing_device_2 is shown to have no print jobs associated with it, and thus no print jobs are currently assigned to printing_device_2.

Preferably a print job entry, such as print_job_2, is marked as "printed" after being sent to any of its associated printing devices so that it is preferably printed (unless otherwise directed) by only one of its associated printing devices. Alternatively a print job entry, such as print_job_2, may remain active until it is printed by all of, or by all of specifically identified ones of, its associated printing devices. For example, if print_job_2 specifically identifies printing_device_3 as a device needing to print print_job_2, then print_job_2 will remain active until it is printed by printing_device_3 irrespective of whether it has already been printed by either, or both, of printing_device_4 and printing_device_n. Similarly, if print_job_2 specifically identifies both printing_device_3 and printing_device_n as devices needing to print print_job_2, then print_job_2 will remain active until it is printed by both printing_device_3 and printing_device_n. Print In a one embodiment of the present invention, it is preferred that prospective users first be registered and listed within User Record 19 prior to making use of the printing services provide by network server 15. However, in an alternate embodiment more fully explained below, pre-registration of a prospective user may not be necessary if a group access account is setup instead of, or in addition to, an individual access account. Nonetheless in the presently preferred embodiment, a prospective new user, such as one using first remote computing device 11, would first contact network server 15 and submit user-registration information to setup an access account. Preferably, the submitted user-registration information includes the new user's name, telephone number, mailing address, an access ID such as a password, and a selection of whether this new account is an individual access count or a group access account. The submitted access ID will provide individual access if the new access account is setup as an individual access count, and will provide group access if the new access count is setup as a group access count.

Once network server 15 has received the new user-registration information and setup a corresponding new entry in User Record 19, the newly registered user is granted access to various services. The new user may submit new print job files for remote printing, as is explained more fully below, or may register a new remote printing device. To register a new remote printing device, such as remote printing devices 12 and 16, a user would provide specified printer information to generate a new printing device data entry, PD—data, for the printing device being registered. The specified printer information may include characterizing information such as the submitted printer's model name, printing capabilities, physical location address, internet protocol address (i.e. IP address) and corresponding socket if available, a point-of-contact email address, and/or the printer's software driver. Network server 15 prepares a new entry within printer record 21 for the submitted new printing device and creates a corresponding new data block entry, PD_data, in Printer Data Blocks 29. As explained below, the submitted characterizing printer information may also include an access ID, such as an identifying password, for the printer. In this manner, the printer may singularly be identified by registered users other than the user that submitted the printer. The registered user that submits a remote printing device may alter the password of the submitted, registered printing device at any time.

In operation, a print job file is first uploaded through the Internet 17 to network server 15. The uploaded print job file is then sent via the Internet 17 to one of its associated printing devices for printing. Before either of first 11, second 13, third 14, or fourth 12 remote computing device can make use of the services provided by network server 15, however, it is preferable that they be registered with network server 15. Registered users within User Record 19 are permitted to submit files for printing and to adjust various permissions parameters, as explained more fully below, and registered printing devices within Printer Record 21 are permitted to download files for printing in accordance with their permission settings.

In the following exemplary implementation of the first embodiment, it is assumed that first computing device 11 creates a print job file to be printed, sends the created print job file to network server 15, and the created print job file is eventually printed by fourth computing device 12. Thus, first computing device 11 needs to be registered as a registered user within User Record 19, and fourth computing device 12 needs to be registered as a registered printing device within Printer Record 21.

In the present first example, it is therefore assumed that fourth computing device 12 is a remote printing device having access to the Internet 17, and is therefore illustratively identified as first remote printing device 12. It is possible, however, that any remote computing device, such as first 11, second 13, or fourth 14 computing device may be registered both within User Record 19 (meaning that it may submit print jobs to network server 15 for remote printing) and within Printer Record 21 (meaning that it may receive print job files from network server 15 for local printing). This would be the case if, for example, such a remote computing device was comprised of a multi-function device having file generating and printing capability, such as a printer/scanner combination device with access to the internet. Alternatively, such a remote computing device could be comprised of a personal computer networked to the Internet 17 and having access to a local printer, such as the combination of third remote computing device 14 and local printing device 16. A user of such a remote computing device could register himself/herself as a user within User Record 19 in order to submit locally created print job files to network server 15 for later remote printing to a printing device within Printer Record 21. The same user could likewise register the locally connected printer, such as printer 16, within Printer Record 21 to access remote print job files from data store 31 for local printing.

Returning to the present illustrative embodiment of FIG. 1, the preferred operation of the present invention is described first with the assumption that both first 11 and fourth 12 remote computing device are already registered, and then described with the assumption that one or both of them are not yet registered. In the present first embodiment, first computing device 11 is registered as a registered user within User Record 19, and fourth remote computing device 12 is registered as a registered printing device within Printer Record 21.

In a simplified scenario, first computing device 11 accesses network server 15 and submits its user name, and preferably also submits a user password. In the presently preferred embodiment, Access-ID Record 23 maintains a user password correlated to a corresponding registered user in User Record 19. After verifying that the submitted password and user name correspond to each other, network server 15 provides first remote computing device 11 with a printer list of remote printing devices to which it has printing access, as determined from the submitted user name and/or the submitted user password. Preferably, the printer list excludes any printing devices to which the user of first remote computing device 11 has printing permission access but which are categorized as inactive by network server 15. In other words, only active printing devices to which the user of first remote computing device 11 as access permission are included in the printer listed provided by network server 15.

As explained above, when a printing device is first registered, network server 15 is supplied with various characterizing information with which to construct a corresponding data block entry, PD_data, in Printer Data Blocks 29. Preferably, network server 15 further categorizes a registered printing device as active or inactive based on how recently all, or a predefined part of, the registered printing device's charactering data has been updated. In a preferred embodiment, each remote printing device is responsible for maintaining its own categorization set to "active" in network server 15. In other words, a registered printing device may be required to periodically submit an update to network server 15 for a specific data entry in the printing device's corresponding PD_data entry. For example, each registered printing device may be required to periodically contact network server 15 and identify itself as active by submitting its associated access ID. By requiring the printer's associated access ID, it can be assured the status of a remote printing device is not updated by some other network device. If a predetermined amount of time elapses without network server 15 receiving an updating communication contact from a specific registered printing device, then network server 15 categorizes the specific registered printing device as "inactive" and does not include it in any printer lists. Network server 15 re-categorizes the specific printing device as "active" when the specific printing device once again contacts network server 15 and provides the required updated data.

However, since the remote printing devices may be located in various local networks behind firewalls and be subject to having their assigned IP address changed by a local network server at indeterminate times, the preferred embodiment of the present invention categorizes a registered remote printing device as "active" only if there is some level of assurance that the registered printing device's IP address listed in its associated PD data entry is current and valid. To determine this level of assurance, each registered printing device is required to periodically contact network server 15 and re-submit its IP address. If a predetermined amount of time elapses without network server receiving an updated IP address from a specific registered printing device, then network server 15 will re-categorize the specific registered printing device as "inactive" until the specific registered printing device contacts network server 15 and submits an updated IP address. Thus, in order to maintain an "active" categorization, a registered printing device may be required to update its IP address daily, weekly, monthly, or several times per day.

Figure 2:
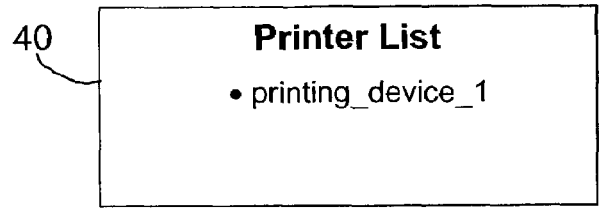
FIG. 2 shows three alternate printer lists in accord with the present invention.
Figure 2:
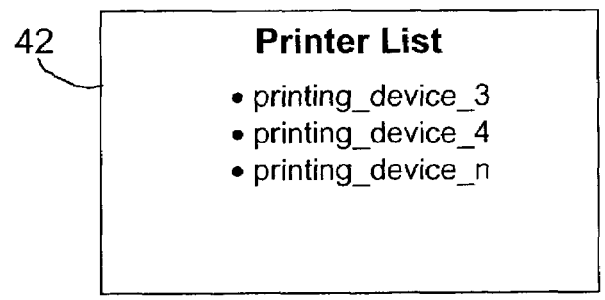
Figure 2:
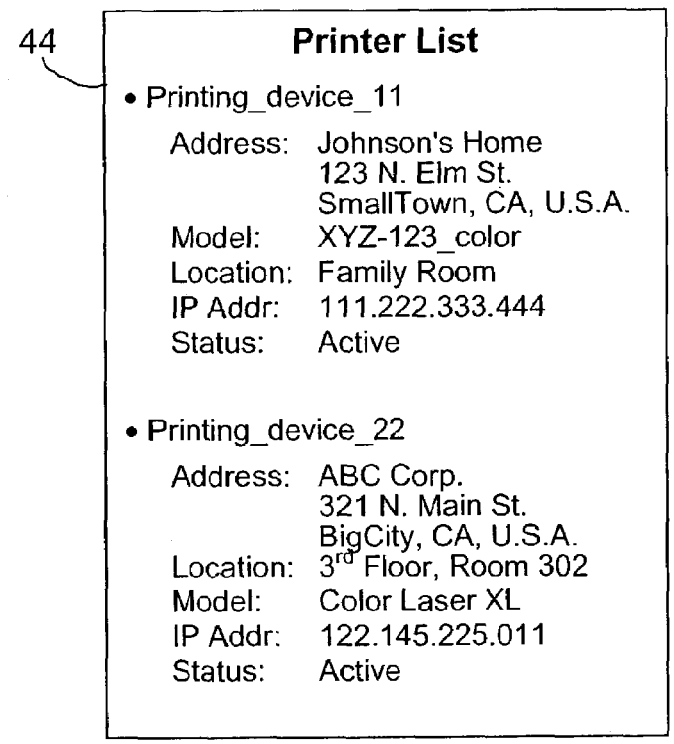

Returning to the present simplified scenario, if the submitted user password corresponds to Access_ID_1 in Access-ID Record 23, which is illustratively correlated to only printing_device_1 by a dotted arrow, then network 15 would provide first remote computing device 11 with a printer list 40 (shown in FIG. 2) indicating only printing_device_1 as a possible printing device to associate with (i.e. assign to) the print job file being submitted for printing. Alternatively, if the correctly submitted password corresponds to Access_ID_m, which is illustratively correlated to printing_device_3, printing_device_4, and printing_device_n, then network server 15 would provide first remote computing device 11 with a printer list 42 showing printing_device_3, printing_device_4, and printing_device_n as a possible printing devices to associate which (i.e. assign to) the submitted print job file for printing. At this point, the user of first remote computing device 11 may select any or all of the printing devices on the printer list provided by network server 15 as target recipients of the submitted print job file.

It is preferred that in addition to listing all the remote printing devices associated with the submitted registered user name and password, network server 15 additional provide some descriptive information, as stored in Printer Data Blocks 29, corresponding to each remote printing device on the provided printer list. As explained above, Printer Data Blocks 29 store various data regarding each registered remote printing device. For example, printer list 44 shows exemplary remote printing devices that may include any of the address of each printing device's physical location, its model name, IP address, and whether it is active or inactive.

Returning to FIG. 1, after selecting the target remote printing device(s) from the supplied printer list, first remote computing device 11 transfers (i.e. uploads) its print job file to network server 15, which in turn stores the print job file in data store 31. Additionally, network server 15 adds a record entry in Print-Job Record 25 listing not only the print job file name, but preferably also including: a URL to the print job file within data store 31; the name of the registered user that submitted the print job file; the size of the print job file; and a listing of the printing devices that were associated with (i.e. given access to) the submitted print job file. As explained above, the associated printing devices are the printing devices, among those provided in the printer list, selected as target remote printing device(s) by first remote computing device 11.

For example, if the first remote computing device 11 was identified as access_ID_2, which is illustratively shown by dash arrows to have access to printing_device_1 and printing device_4, and first remote computing device 11 selected only printing_device_1 as a target printing device for associating with its submitted print job file, then from FIG. 1 one may assume that the submitted print job is identified as print_job_1 in Printer-Job Record 25 since it shows an association by a solid arrow to only printing_device_1. However, in the following description, it is assumed that: first remote computing device 11 was identified as access_ID_m; first remote computing device 11 selected all of its available remote printing devices as target printing devices; and the print job file it submitted is identified as print_job_2 within Print-Job Record 25, such that each of printing_device_3, printing_device_4, and printing_device_n are shown associated with print_job_2 by solid arrows in FIG. 1.

Figure 3:
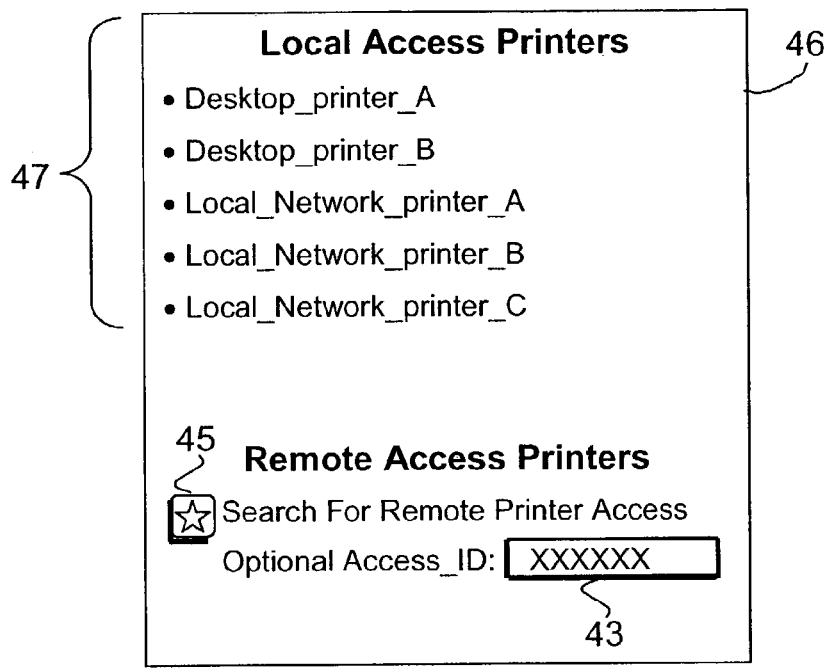
FIG. 3 is a first view of a printer driver, graphic user interface in accord with the present invention.

The above described sequence for submitting a print-job file for printing by a remote printing device can, of course, be automated in the form of software and implemented by a remote computing device, such as first remote computing device 11. With reference to FIG. 3, when a user of first remote computing device 11 selects a print option, the user is preferably, as is typical in the art, presented with a list 46 of locally available printing devices 47. Such locally available printing devices are directly connected to first computing device 11 and/or are local network printing devices connected to a local network to which first computing device 11 is also a part. However in the present invention, the user of first computing device is preferably also presented with a symbolic representation 45, such as an input button, for selecting remote printing devices.

Figure 4:
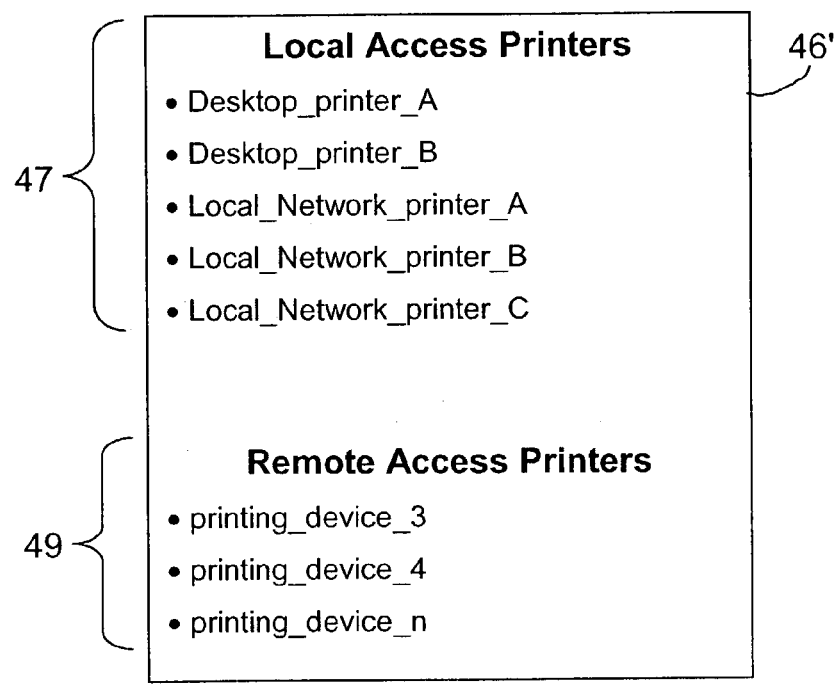
FIG. 4 is a second view of the printer driver, graphic user interface in accord with the present invention.

In a preferred embodiment, the symbolic representation 45 does not indicate any information about any available remote printing device. However, if the user selects the symbolic representation 45, then first computing device 11 would implement a software routine to execute the above described sequence for contacting network server 15, submitting an identifying access ID, and receiving a printer list (such as any of those shown in FIG. 2) of available remote printing device associated with the submitted access _ID. In a preferred embodiment, first computing device 11 uses a default access_ID, but may alternatively provide a text box 43 for requesting a user-specified access_ID from the user for submitting to network server 15. Upon receiving a printer list 40, 42, or 44, first remote computing device 11 provides an updated list 46' of available printers, as shown in FIG. 4, to include any remote computing devices 49 listed in the printer list provided by network server 15. Thus, if the user selects one of the remote printing devices, then the software routine would submit, i.e. upload, the print-job file to network server 15 along with an indication of which remote printing device(s) 49 were selected as target printing devices for the submitted print-job file.

Afterwards, first remote computing device 11 can check with network server 15 to ascertain if its submitted print_job_2 has been printed by any of (and if so which ones of) its selected target printing devices, but first remote computing device 11 has no control over how quickly its submitted print_job_2 gets printed. It is possible that network server 15 may send a transmission to the target printing devices letting them know that a print job is waiting for them for printing, but is preferred that no such message be transmitted. If desired, network server 15 may send an e-mail to a an e-mail addressee submitted by first remote computing device 11, but the addressee is not likely to be any of the printing devices within Printer Record 21. Rather, the addressee may be an individual having access to one of the target printing devices selected by first remote computing device 11. This e-mail addressee becomes a personal point of contact for the target printing device. Alternatively, the e-mail may be sent to any default point of contact email listed within the remote printer's corresponding data block within Printer Data Blocks 29. In this case, each printing device within Printer Record 21 is assumed to have an associated point of contact e-mail listed among its associated PD-data within Printer Data Blocks 29, such that it is no longer necessary for first remote computing device 11 to submit any point-of-contact e-mail. It is preferred that the owner of each printing device within Printer Record 21 provide a point-of-contact e-mail address that may be automatically, or selectively contacted, to notify that a print job is waiting for the particular printing device.

In an alternate embodiment of the present invention, network server 15 may transmit the print job file directly to a target printing device by first contacting the target printing device and requesting permission for transmitting the print job file. This is possible because network server 15 preferably maintains a record of the IP address of each registered printing device. Once the target printing device has granted permission, network server 15 then proceeds to transmit the print job file to the target printing device.

However, in the presently preferred embodiment, it is preferred that network server 15 initiate no communication directly with any of the target remote computing devices for purposes of initiating the transfer of a print job file. This is because the printing device may be located behind a firewall in a remote, private network and thus may not be accessible by network server 15. That is, the firewall would inhibit any direct communication initiated from outside the local network (such as from network server 15) to any printing device within the local network. Instead, it is preferred that network server 15 wait for the remote printing devices to contact network server 15 and inquire about any print jobs waiting for their attention.

For purpose of illustration, it is assumed that in the presently discussed embodiment, one of the target printing devices (i.e. either printing_device_3, printing_device_4, or printing_device_n) is embodied by fourth remote computing device 12. Thus in the presently preferred embodiment, fourth remote computing device 12 would periodically initiate communication through the Internet 17 to network server 15 to inquire whether there are any unprinted print-jobs waiting for it. Thus, fourth remote printing 12 identifies itself to network server 15 as a printing device and provides at least a printer ID, and preferably also a password.

In one embodiment, the printer ID identifies one of the registered printing devices within Printer Record 21. In an alternative embodiment, the printer ID identified a Printer Access ID. In this alternative embodiment, the Printer Access ID may be maintained in a separate record of Printer Access ID's accessible by network server 15, or may alternatively be treated as an access ID within Access-ID Record 23. In this case, both the user access ID's and Printer Access ID's are maintained within the same Access-ID Record 23, but this is for ease of management and not critical to the invention. Both of these alternate embodiments are discussed in turn below.

Assuming first that the printer ID identifies one of the registered printing devices within printing record 21, then network server 15 identifies all the print jobs waiting for the identified printing device, and indicates which print jobs have already been printed either by the identified printing device or by some other printing device. Preferably, this information is provided in the form of a web page, as commonly used in the world wide web, WWW. In the present example, it is further assumed that the fourth remote printing device 12 is identified as printing$_{13}$ device_3, which as illustratively shown by two solid lines to be associated with print_job_2 and print_job_i. Since network server 15 provides a world wide web interface similar to other internet web pages, fourth remote computing device 12 may select which print job to print, and proceed to download the selected print job file as if it were a regular web page downloaded using standard HTTP protocols, such as the GET utility. This may be done directly from network server 15, which accesses the selected print job file from data store 31. Since remote printing device 12 initiates the downloading of the print job file using standard internet protocols, this download process is not impeded even if remote printing device 12 is located behind a protective firewall.

Alternatively, if data store 31 is directly accessible through the internet via dotted line 35, network server 15 may provide fourth remote computing device 12 the URL for the appropriate print job file(s) within data store 31. Once the fourth remote computing device 12 has received the URL's of the print jobs, it may download the print job files directly from data store 31 through the Internet 17.

In one implementation of the present invention, before downloading the selected print job file, remote printing device 12 first determines if the selected print job file is in a form of a printer-driver-processed file. If it is, then remote printing device 12 determines if it is capable of properly understanding the printer-driver-processed file, and downloads the selected print-job file only if it determines that it is capable of printing the selected print-job file. If the selected print job file is in the form of a journal file, then remote printing device 12 may optionally download the selected journal file for printing, or may identify is its model type to network server 15 and permit network server 15 to process the journal file using the appropriate printer drive software for the identified model to produce a printer-driver-processed file for download by said printing device 12. It the remote computing device were to consist of third computing device 14 and local printing device 16, then the third computing device 14 would submit the model type of local printing device 16 to network server 15 to receive an appropriate printer-driver-processed file.

Returning now to the alternate embodiment where the printer ID identified a Printer Access ID within Access-ID Record 23, and illustratively assuming that the submitted Printer Access ID corresponds to Access_ID_2, then network server 15 would proceed to identify all printing devices within Printer Record 21 associated with Access_ID_2. In the present example, both printing_device_1 and printing_device_3 are associated with Access_ID_2. Network Server 15 then proceeds to identify all print jobs associated with printing_device_1 and printing_device_3. As illustratively shown in FIG. 1, print_job_1 is associated only with printing_device_1. However, print_job_2 and print_job_i are both associated with printing_device_3. Thus, network server would present fourth remote computing device 12 a list showing print_job_1, print_job_2, and print_job_i as print jobs available for printing. Similarly, any of remote computing devices 11, 12, 13, and 14 that submits a printer ID that identifies itself as Printer Access ID corresponding to Access_ID_2 would be presented with the same list showing print_job_1, print_job_2 and print_job_i available for download and printing. Preferably, network server 15 would also specify which of the print jobs have already been downloaded for printing by any other, and which other, printing devices. The point is that by submitting a general Print Access ID, one gains access to a group permission without the need of identifying oneself as any specific printing device, and without being a pre-registered printing device within printer record 21.

Fourth remote computing device 12 then selects which print job(s) to download for printing. As in the previous case, fourth remote computing device 12 may alternatively download the print job files from network server 15, or receive the appropriate URL(s) for the print job files and download them directly from data store 31 through the Internet 17 using standard internet protocols, such as HTTP.

Figure 5:
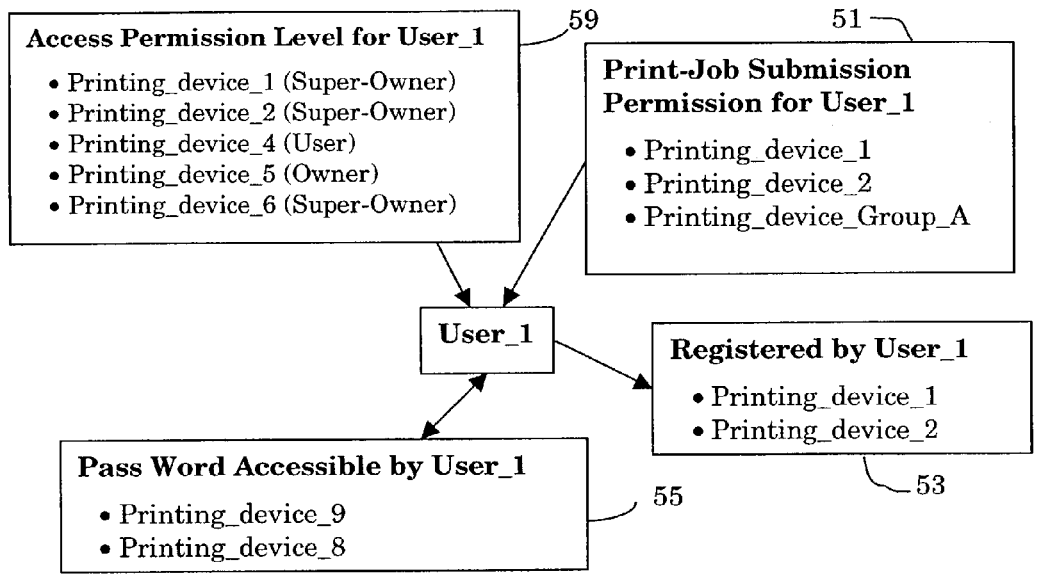
FIG. 5 is an organizational block diagram for correlating user printing permissions with a plurality of remote printing devices in accord with the present invention.
Figure 5:
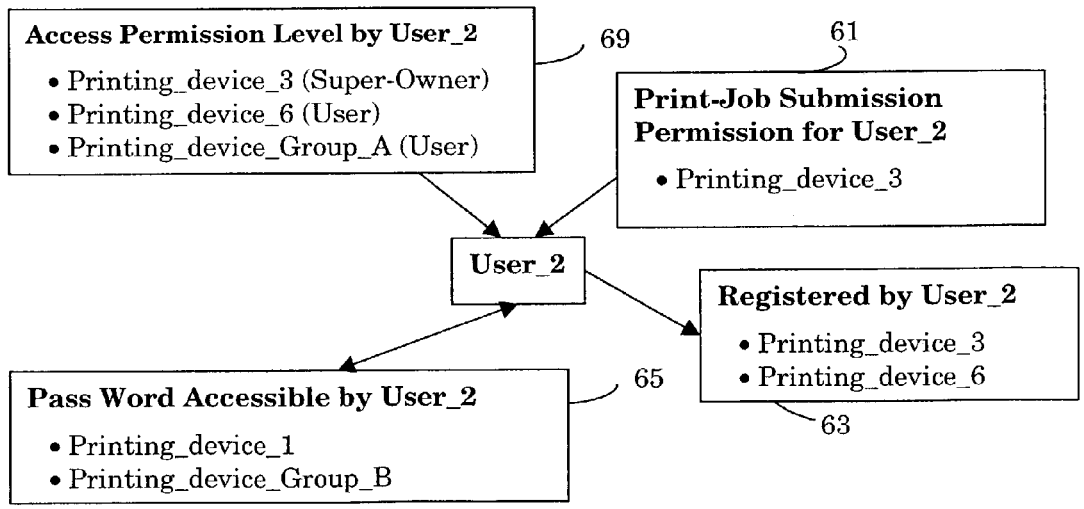

With reference to FIG. 5, examples of available permission types and permission levels assignable to two exemplarity users, i.e. User_1 and User_2, in accord with an alternate preferred embodiment are shown. It is to be understood that User_1 and User_2 represents any registered user listed within User Record 19. The permission types and permission levels that may be associated between a user and various remote printing devices are divided into four permission groups, i.e. 51-59 associated with User_1 and 61-69 associated with User_2. Groups 59 and 69 additionally show access permission level associations.

The four shown groups are: printing devices registered by a user, collectively identified as groups 53 and 63 respectively associated with User_1 and User_2; printing devices to which a user has print-job-submission permission, collectively identified as groups 51 and 61 respectively associated with User_1 and User_2; access permission levels a user has to a remote printing devices, collectively identified as groups 59 and 69 respectively associated with User_1 and User_2; and printing devices to which a user has password dependent access, collectively identified as groups 55 and 65 respectively associated with User_1 and User_2.

Access permission is delineated into three permission levels; user, owner, and super-owner. If a user has user-level access permission to a printing device, then the user may select the printing device as a target printer for printing a print-job submitted to network server 15, but has no control over who else may also select the printing device as target printing device to which to submit a print-job.

A user having owner-level access permission is not only free to submit a print-job to the printing device, but may also grant print access permission to other users that do not yet have print access permission. Additionally, an owner-level user may remove print access permission from a user-level owner.

In an alternate embodiment, when granting user-level permission to another user, a owner-level user may also assign the other user one of an owner-level status or user-level status. In the preferred embodiment, however, all users granted access permission by an owner-level user are automatically granted only user-level status, and only a user having super-owner status (i.e. having super-owner level, access permission) may grant owner-level status to another user. In addition to the ability to grant, or assign, owner-level permission, a super-owner level user may also remove access permission from owner-level users and user-level users. Also a user having super-owner status may change the current access permission level of another user to that of a user-level permission. It is to be understood that a super-owner status user may submit a print-job for printing on the printing device to which it has access.

The users having super-owner level and owner-level access permission preferably may also affect the permission groups defining print-job-submission (51 and 61) and printer-specific password accessibility (55 and 65). For example, a user that has super-owner status associated with a remote printing device (and preferably also a user having owner-level access permission) may grant to (or remove from) another user print-job-submission permission and password access permission to the remote printing device.

It is preferred that each printing device be limited to one user having super-owner status. In this case, a user having super-owner status may relinquish its super-owner status to another user. When doing this, the user that had super-owner status preferable is assigned the access permission level of the other user to which super-owner status is passed. For example, if a first user having super-owner status exchanges access permission levels with a second user having owner-status, then after the exchange, the first user will have owner-level status and the second user will have super-owner status. In an alternate embodiment, when a first user having super-owner status relinquishes it super-owner level purchase permission to a second user, the first user is automatically assigned owner-level access permission irrespective of the access permission status of the second user.

In still an alternate embodiment, multiple users may have super-owner status associated with a particular remote printing device. In this case, a first user having super-owner status may grant super-owner status to a second user without the first user relinquishing its super-owner status. Additionally, a user having super-owner status may alter its own permission level status to that of owner-level status. This is permissible only if there still remains at least one other user who also has super-owner status. That is, it is preferred that each remote printing device having at least one super-owner level user associated with it.

In a preferred embodiment, the registered user that registers a new printing device is automatically assigned super-owner status for that newly registered printing device. For example according to group 53, User_1 registered printing_device_1 and printing_device_2, and thus group 59 shows that User_1 also has super-owner status associated with printing_device_1 and printing_device_2. Group 59 also shows that User_1 has been granted owner-level access permission to printing_device_5, and granted user-level access permission to printing_device_4.

More interestingly in reference to User_2, group 63 shows that User_2 registered printing_device_6, but as shown in group 69, User_2 has only a user-level access permission associated with printing_device_6. Furthermore, Group 59 shows that User_1 has super-owner level access permission for printing_device_6. Thus, it will be understood that the currently shown permission levels were achieved as a result of User_2 relinquishing its super-owner status to User_1. Furthermore, after obtaining super-owner status, User_1 then assigned User_2 a user-level access permission for printing_device_6.

A user may also be granted password accessibility to a particular printing device. For example, group 55 shows that User_1 has password access for submitting a print-job to printing_device_8 and printing_device_9. Thus, after identifying itself as User_1 and submitting the correct password for printing_device_9, network server 15 will present User_1 a printer list including printing_device_9 as a possible target printing device to which to assign a submitted print-job file. In the present example, User_1 also has password access to printing_device_8. It is preferred that password permission for a target printing device be assigned to a selected user by another user that has either owner-level status or super-owner level status associated with the target printing device.

Additionally, the owner of a printing device may define password access to a remote printing device without specifying a specific user with whom to associate the password. This type of globally available password access (i.e. available to all users, preferably irrespective of whether the user is registered or not) provides password access to users who are visiting network server 15, and are not pre-registered. Thus a visitor to network server 15 may submit a print-job file to a specific printing device if the specific printing device has a globally available password for permitting access.

Lastly, it is preferred that multiple printing devices be combinable into printing device groups that can be associated with particular permission groups for each user. For example, Printing_Device_Group_A 71 is within Print-Job Submission Permission group 51, which specifies all printing devices to which User_1 has permission to submit a print-job file for printing. Therefore, User_1 has permission to submit a print-job file to every remote printing device within Printing_Device_Group_A 71. That is, User_1 may select printing_device_10, printing_device_17, printing_device_20 and/or printing_device_22 for printing a print-job file submitted to network server 15.

Groups 61, 63, and 69 show that User_2 has retained Super-owner status for printing_device_3, which it registered.

Group 65 shows that User_1 has granted, password permission access for printing_device_1 specifically to User_2. As dictated by the permissions provided by User_1, User_2 may gain access to printing_device_1 buy identifying itself to network server 15 and submitting the appropriate password. Group 65 further shows that User_2 has password access permission to Printing_Device_Group_B 73. By submitting the access password for Printing_Device_Group_B 73, User_2 gains print-job submission access to all registered printing devices associated with Printing_Device_B

73. In the present case, Printing_Device_Group_B 73 is comprised of printing_device_1 and printing_device_2. Thus, User_2 may alternatively gain access to printing_device_1 by submitting the password associated with Printing_Device_Group_B. Thus, if User_2 submits an Access_ID for Printing_Device_Group_B, network server 15 would present User_2 with a printer list including at least printing $_{13}$ device_1 and printing_device_2. Alternatively, the printer list would include an entry for Printer_Device_Group_B itself, such that User_2 may elect Printer_Device_Group_B as a target group to which to assign, i.e. associate, a submitted print job file. In this case, all printing devices within Printing_Device_Group_B would automatically be associated with the print job file submitted by User_2.

In an alternative embodiment, printing device groups may optionally have an associated printer-group Access ID such that any user may again access to a particular printing device group by submitting the appropriate printer-group Access ID. In this case, network server 15 would preferably incorporate the printer-group Access ID into Access-ID record 23 and incorporate the corresponding printing device group as an associated entry within Printer Record 21.

Figure 6:
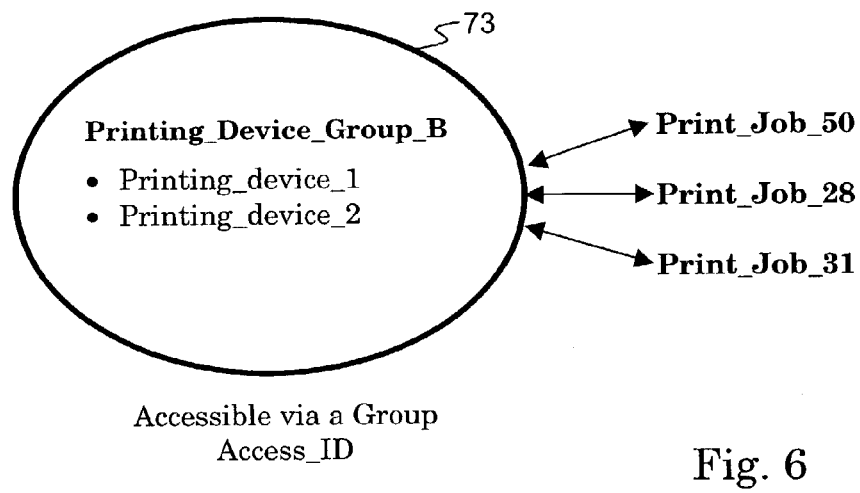
FIG. 6 is a first alternate system for collecting access permission to multiple printing devices into a group of printing devices.

Furthermore, it is preferred that print jobs may be associated with particular printing device groups such that if a print job is associated with a particular printing device group, then the print job is automatically associated with (i.e. downloadable and printable by) every printing device within the printing device group. For example in FIG. 6, Printing_Device_Group_B 73 is extemporarily shown to be associated with print_job_28, print_job_31, and print_job_50, with no restriction on who submitted the individual print jobs as long the submitter elected Printing_Device_Group_B as a target printer group. Thus, any of printing_device_1 or printing_device_2, which comprise Printing_Device_Group_B, may download and print print_job_28, print_job_31, and print_job_50.

In this case, when either of printing_device_1 or printing_device_2 contacts network server 15 and submits an access ID identifying itself, network server 15 responds with a list of awaiting print jobs that includes not only any print jobs that were individually associated with the particular printing device (printing_device_1 or printing_device_2), but also additionally includes all print jobs associated with any printing groups to which the particular printing device belongs. In the case, the print job list would additionally include print_job_28, print_job_31, and print_job_50.

Just like a User may access a printing device group for purposes of submitting a print job to the group, as a whole, it is desirable that a printing device may also gain access to a printing device group by submitting the printer-group Access ID of a particular printing device group. In this, when a printing device solicits network server 15 and submitting a printer-group Access ID, network server 15 would provide the soliciting printing device with a list of all print jobs associated with the identified printing device group, as a whole, irrespective of whether the printing device is a part of the printing device group or not.

Figure 7:
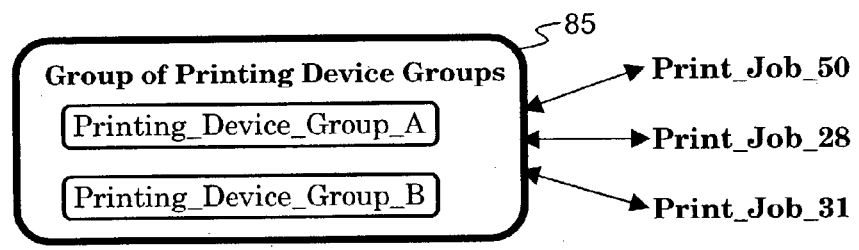
FIG. 7 is a second alternate system for collecting multiple printing device groups into a group of printing device groups.

With reference to FIG. 7, in still an alternate embodiment, multiple printing device groups may be combined in groups of printing device groups. For example, 85 denotes a group consisting of Printing_Device_Group_A and Printing_Device_Group_B. Thus, if a user gains access to group 85, such as by submitting an Access_ID associated with group 85, then the user would likewise gain access to all printing devices within every printing group within group 85. That is, the user would gain access to all printing devices within Printing_Device_Group_A and Printing_Device_Group_B. If the user were to select group 85 as a target group when submitting a print job file, then the print job file would be automatically associated with every printing device within both Printing_Device_Group_A and Printing_Device_Group_B. Similarly, if a printing device gains access to group 85, such as by submitting the Access_ID associated with group 85, then network server 15 would present the printing device with a list of all print jobs associated with all the printing groups within group 85.

Figure 8:
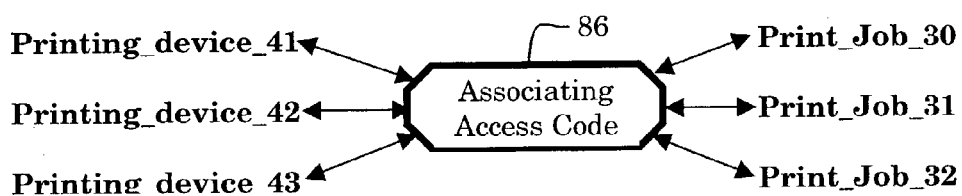
FIG. 8 is a third alternate permission control scheme where permission associations between printing devices and print job files are managed by means of common Associating Access Codes.

In a last alternate embodiment for managing print jobs and correspondingly associated printing devices, FIG. 8 shows the use of an Associating Access Code 86 for correlating printing device to submitted print files. Network server 15 preferably manages the Associating Access Code in a similar manner as it manages the Access_ID's described above. In the present case, when a User accesses network server 15, the user may submit a print job file an assign the file an Associating Access Code 86. Preferably, the PD_Data blocks associated with each printing device would include an optional, freely assigned associating access code. The submitted print job file would then be automatically associated with any printing device having a matching Associating Access Code. Similarly, if an access code matching the submitted Associating Access Code is added to a registered printing device, then the printing device would automatically gain access to all print job files having a matching Associating Access Code. In essence, submitted print job files are indirectly associated, i.e. correlated, to registered printing devices by being primarily (i.e. firstly) associated with the an Associating Access Code that matches the Associating Access Code belonging to the respective registered printing devices. Similarly, if a printing device submits an Associating Access Code to network server 15, then network server 15 would provide the printing device with a list of all print job files having a matching Associating Access Code. In the example of FIG. 8, printing_device_41, printing_device_42, and printing_device_43 are associated with print_job_30, print_job_31, and print_job_32 by means of a common Associating Access Code 86.

Returning now the present embodiment of FIG. 5, any user may construct a printing device group 71 or 73, but only a owner-level user or super-owner level user of a target printing device may incorporate the target printing device into the constructed printing device group. For example, Printing_Device_Group_B 73 may have been registered by User_2, but it would have remained empty until User_1 added printing_device_1 and printing_device_2 (to which User_1 has super-owner status) into Printing_Device_Group_B 73. Thus, it is possible to have an empty-set printing device group within the above described, permission access groups.

Figure 9:
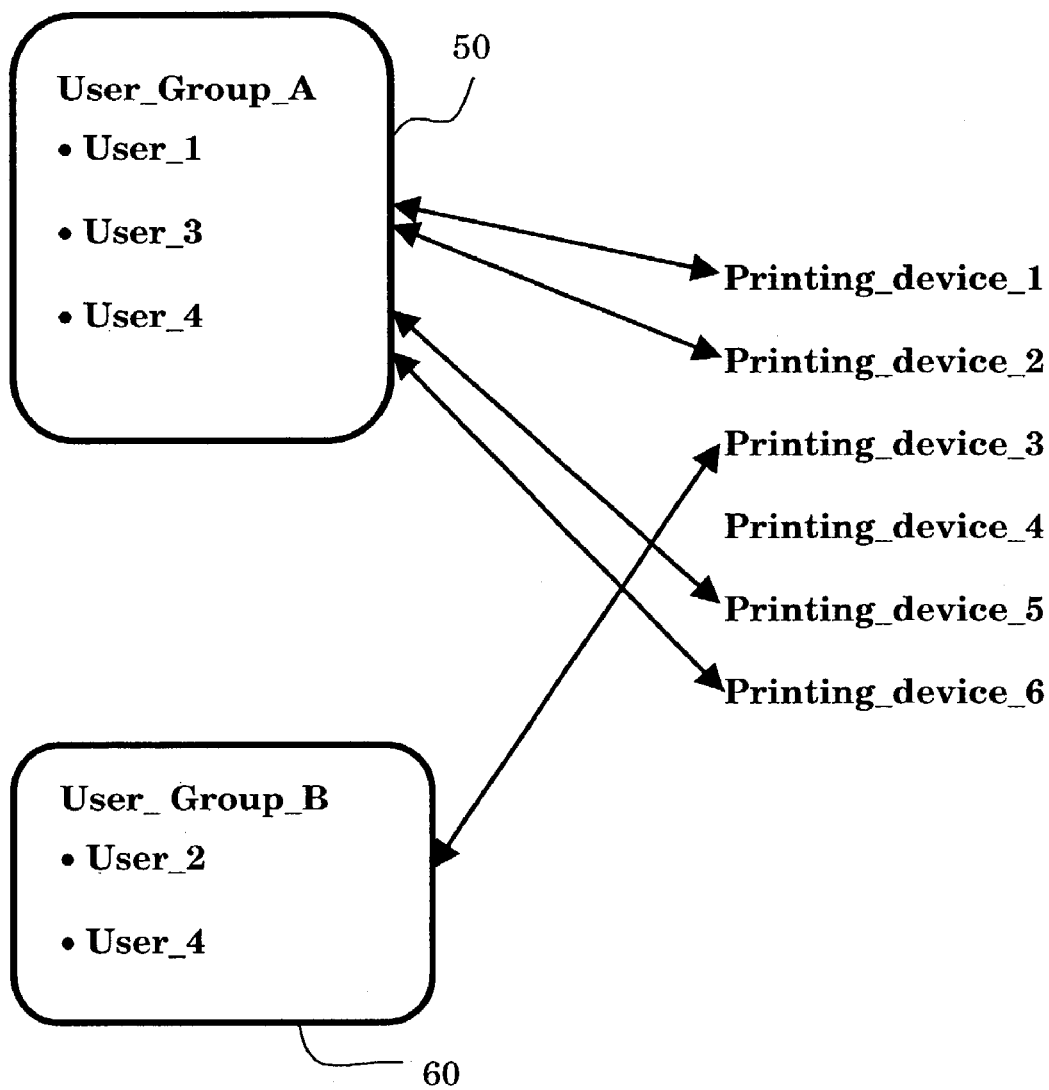
FIG. 9 is an alternate view of access permission associations between user groups with various printing devices.

With reference to FIG. 9, an alternate embodiment organizes users into multiple user groups. As in the previous case of the printing device groups, any registered user may construct a new user group, but in the present case the user that constructs the user groups is designated the owner of the newly created user group. The owner of a user group may assign an access password for the user group, and add other registered users to the user group. The owner of a user group may assign the user group print-job permission to any printing device to which he has owner status permission or super-owner status permission. Any other user added to the user group may likewise add print permission to any printing device that he has owner status or super-owner status permission.

For example in FIG. 9, User_1 from FIG. 5 has created User_Group_A 50, and added two other users, i.e. User_3 and User_4, to User_Group_A 50. From group 59 of FIG. 5, it is evident that User_1 has either owner or super-owner permission status to printing devices 1, 2, 5, and 6. Thus in FIG. 9, User_1 has associated (i.e. granted printing permission access) User_Group_A 50 to printing devices 1, 2, 5 and 6. Similarly, User_2 of FIG. 5 has created User_Group_B 60, and associated, i.e. added, User_4 to User_Group_B 60. Furthermore from group 69 of FIG. 5, it is evident that User_2 may grant printing permission to only printing_device_3, with which User_2 has an associated super-owner status. FIG. 5 further shows that User_2 has only user-level permission to printing_device_5 and to Printing_Device_Group_A, and thus cannot grant any other user printing permission to these devices. Thus in FIG. 9, User_2 assigns User_Group_B 60 printing permission access to printing_device_3, as is illustrate by a double-headed arrow. If User_2 had owner status, or super-owner status, associated with Printing_Device_Group_A, then User_2 would be permitted to associate either Printing_Device_Group_A with User_Group_B (in which case all users associated with User_Group_B would gain printing access to each printing devices associated with Printing_Device_Group_A), or associate selected printing devices within Printing_Device_Group_A to User_Group_B (in which case all users associated with User_Group_B would gain printing access to each selected printing device that was associated with User_Group_B). As a result of these assignments, FIG. 9 shows that User_4 has printing permission access to printing devices 1, 2, 5, and 6 through User_Group_A 50, and has access to printing_device_3 through User_Group_B 60. Therefore, if User_4 were to identify itself to network server 15 of FIG. 1 and request access to remote printing devices, network server 15 would provide User_4 with a printer list of remote printing devices listing not only the individual remote printing devices to which User_4 has individual printing access, but also listing all of printing devices 1, 2, 3, 5, and 6, if all are categorized as active.

In an alternate embodiment, after a user group is created, an access password ID may be associated with the access group. Any user may then gain access to the group by submitting the user group's access password ID. Once having gain accessed, a user is automatically associated with the user group, and is granted printing access to all printing devices associated with the user group. In a preferred embodiment, this association lasts only during a current active link. Thus, once the user logs off network server 15, the user's association with the user group is removed. However, when a user gains access to a user group by means of the user group's access password ID, the user may associate an additional remote printing device with the group as long as the user has owner or super-owner permission status associated with the additional remote printing device. When the user logs of network server 15 and its association with the user group is removed, the additional remote printing device added to the user group remains associated with the user group until explicitly removed by any user having owner or super-owner permission status to that same remote printing device. When an access password ID is associated with the access group, the user group's access password ID preferably takes the form of another Access_ID entry within Access_ID Record 23 such that network server 15 manages the user group's access password ID in a similar manner to how it manages the access ID's (i.e. passwords) of individual users.

Preferably, the above described internet printing services are provided on a fee for service system. Additionally, a user may be charged a registration fee at the time of registering with network server 15. Similarly, a registration fee may be required for each additional remote printing device registered with network server 15. Several payment methods may be optionally provided to prospective users of network server 15.

For example, in a first payment method, a registered user may be charged a fixed periodic subscription fee, which provides the user with unlimited access to network server 15 to register new remote printing devices and to submit an unlimited number of print job files for remote printing. Alternatively, the periodic subscription may provide the user with a cap on the number of remote printing devices and print job files that may be submitted to network server 15. If the registered user wishes to submit additional print job files or additional printing devices beyond the number provided by the fixed cap, then the network server 15 may charge the user a fee per additional transaction. That is, network server 15 may charge the user a first fee for each print job submitted beyond the cap number, and charge the user a second fee for each printing device submitted beyond the number provided by the cap. Of course, the cap on the number of the print job files permissible under the subscription plan may be different than the cap number for the number of additional printing devices that may be registered with network server 15.

In still another payment method, each registered user is required to pay a fee per submitted print job file, irrespective of whether a periodic subscription fee is required, or not. In this case, it is preferred that the fee be calculated based on a predetermined print-file submission fee multiplied by the number of remote printing devices targeted for receiving the submitted print file. If desired, each remote printing device may alternatively, or additionally, be required to accept a fee per print job file prior to downloading the print job file. In this case, the charge might be added to a tab account belonging to the remote printing device.

In the above two methods, the fee per submitted print-job file may be recorded in a registered user's account and added to the user's periodic subscription fee.

In still another payment option, an unregistered user may gain temporary access to network system 15 for purposes of submitting a print job to a remote printing device by paying a predetermined print-job file submission fee per number of selected target remote printing devices. The submission fee for unregistered user (i.e. guest users) may be different than the submission fee for registered users. It is to be understood that in this case since the guest user is unregistered and thus does not have any pre-existing associations with any of the remote printing devices registered in Printer Record 21, the guest user may gain access to remote printing devices by submitting an Acess_ID associated with a particular user group or printer group, as explained above. As explained above, once the guest user has gain access to a particular user group or printer group by virtue of a group access_ID, the guest user is granted temporary association with the group and thus also gains access to any remote printing devices associated with that particular group.

Figure 10:
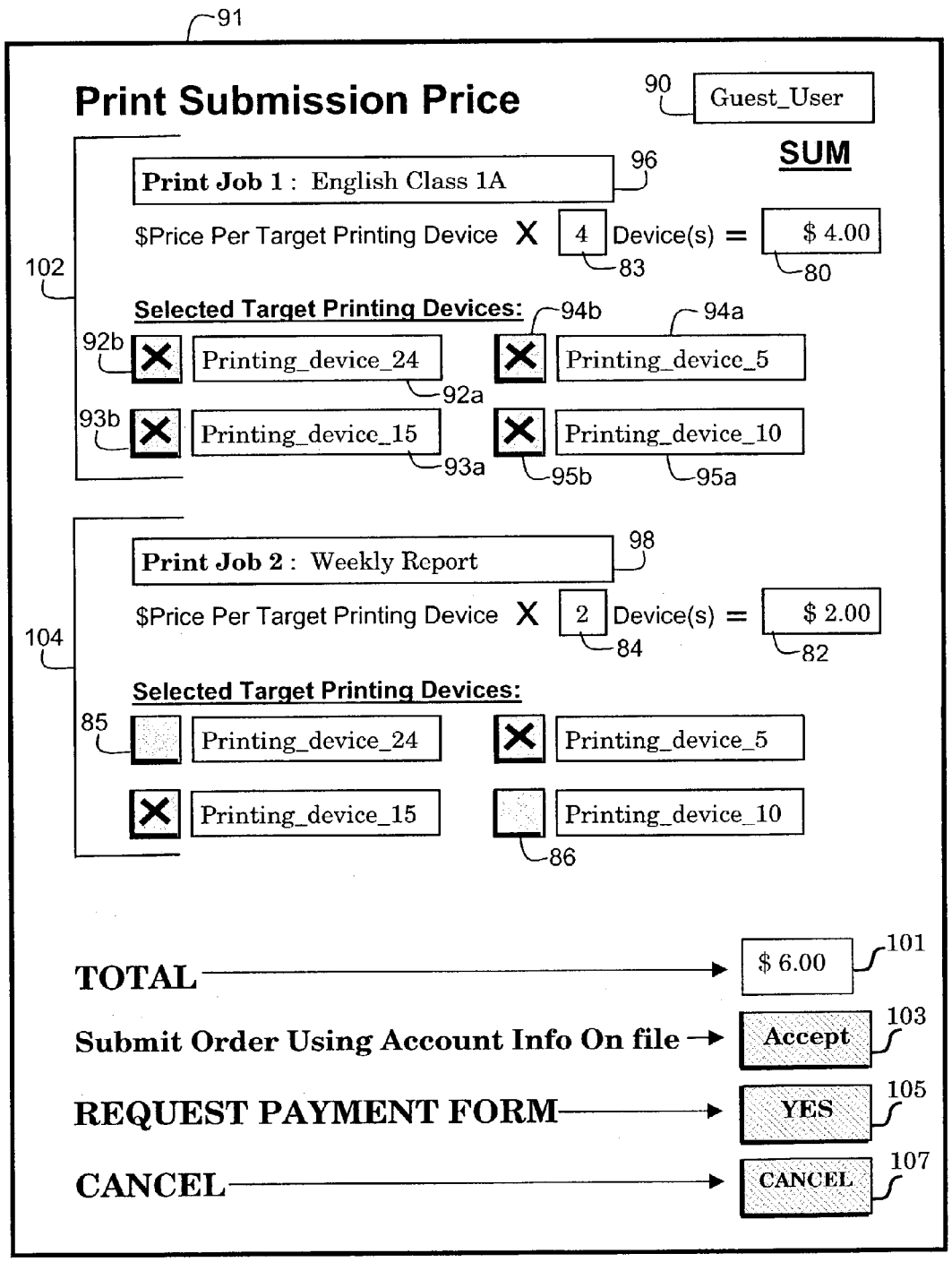
FIG. 10 is an exemplary electronic purchase form in accord with the present invention.

When a user is charged a fee per submitted print job file, network server 15 may provide the user, over the Internet 17, an electronic purchase order form, such exemplary purchase order form 91 shown in FIG. 10. Purchase order form 91 may show the user's registered name in a name_field 90, which may alternately identify the user as a Guest_User if the user is not previously registered.

The combination of a print job file submitted for printing and the selected printing devices targeted for receiving the submitted print job file together constitute a print job, such as 102 and 104. Each print job, 102 and 104, may be assigned a user submitted name for easy reference. For example, purchase order form 91 shows two print jobs 102 and 104; "print job 1" (102) is named "English Class 1A", as shown in name text field 96, and "print job 2" (104) is named "Weekly Report" as shown in name text field 98.

Purchase order form 91 also indicates the cost of each print job in a cost fields 80 and 82, as well as the cumulative total cost of all print jobs submitting during the current communication session in total field 101. Preferably, purchase order form 91 displays the price of submitting a print job file for printing on a per "target printing device" basis. The present example assumes a cost of $1 for each remote printing device targeted for receiving a submitting print job file. Thus, the cost of each print job is calculated my multiplying the "$Price Per Target Printing Device" by the total number of targeted printing devices, which is displayed in a corresponding text box, i.e. 83 and 84.

Preferably, purchase order form 91 is provided after the user has selected target printing devices (from a printer list provided by network server 15) for printing a print job file. Therefore, purchase order form 91 lists the selectively targeted, remote printing devices, each in a separate printer text field 92*a*-95*a*. In the present example, the user is shown to have selected printing_device_24 (92*a*), printing_device_15 (93*a*), printing_device_5 (94*a*), and printing device_10 (95*a*) as target printing devices. Associated with each printer text field 92*a*-95*a* is a corresponding selection box 92*b*-95*b*, on which an x-mark "X" indicates that the printer selection is active. If the user wishes to remove a remote printing device from his list of targeted printing devices prior to finishing the transaction, then x-mark may be selectively toggled on/off, such as by clicking on a corresponding selection box 92*b*-92*b*. If any of selection boxes 92*b*-95*b* is toggled off, such that the x-mark is removed from the toggled selection box, then the printing device shown in the toggled selection box's associated printer text field will no longer be selected as a targeted remote printing device for receiving the submitting print-job file. Accordingly, the number shown in text box 83, the price for the current print job shown in cost field 80, and total price for the current session shown in total field 101, will be automatically updated to reflect the change in the toggled selection box. For example, print job 104 shows that the user initially had targeted printing_device_24, printing_device_15, printing_device_5, and printing device_10 for receiving a submitted print job file, but afterwards toggled text boxes 85 and 86 to deselect printing_device_24 and printing_device_10. As a result, text box 84 shows that only two printing devices remain selected, i.e. remain targeted, and cost field 82 indicates a reduction in the cost of print job 104 to $2. Therefore total field 101 indicates a total cost due of $6 for the current session.

When all selection changes are completed, the user can either submit the purchase order using pre-submitting payment options by selecting Accept option 103, request an electronic payment form by selecting option 105, or cancel the purchase request by selecting the Cancel option 107.

With reference to FIG. 11, if the user requests an electronic payment form (i.e. submits the purchase order form without canceling), then network server 15 may present the user with exemplary payment form 111. If the user selects bill option 113, then the user may fill in the Name and Address field to which a billing statement should be mailed. The user may also elect a different payment method by selecting from a credit card option 115 or a bank draft option 117. Alternatively, the user may cancel the purchase request by selecting Cancel option 121, or may continue with the purchase by selecting Proceed option 119.

If the user selects Bill option 113, rather than having the billing statement mailed to the user, if the user pays a periodic subscription fee to gain access to network server 15, then the cost of the print jobs may alternatively be added to the user's next due subscription billing statement.

If the user selects Bank Draft option 117, then the charges are preferably withdrawn by automatic transfer from a bank account previously submitted by the user.

If the user selects the credit card option, then the user is presented with electronic form 131 of FIG. 12. The user may select from one of multiple charge card options, i.e. card_1 through card_n. The card's number is entered in field 132 and the expiration data is entered in field 133. This transaction is then completed when Submit option 135 is selected, or the transaction is canceled by selection option 137.

The above payment options may be pre-submitted by the user to network server 15 to implement an automatic completion option. In this case, when the user submits purchase order form 91 to network user 15, the user can elect to have the transaction completed automatically using the pre-submitted options. That is, when a purchase request is submitted using this automatic completion option, network server will look up the user's pre-submitted preference, and select the type of payment option (bank draft, bill, etc.) and the necessary payment information. Network server 15 then completes the purchase transaction using these option and payment information.

What is claimed is:

1. An internet printing system comprising:
   a network server accessible over the internet and having:
      a printer-record of registered printing devices remote from said network server;
      an ID-record of ID (indentification) codes, each ID code being associated with at least one of said registered printing devices within said printer-record;
      a data storage unit for storing a plurality of print-job files;
      a print-job record of said stored print-job files, each print-job record being correlated to at least one of said registered printing devices;
   a first remote computing device for accessing said network server over the internet, and submitting an access code to said network server;
   wherein if said access code identifies a target ID code within said ID-record, then said network server provides said first remote computing device with a print-file list of stored print-job files from among said print-job record that are correlated to each registered printing device associated with said target ID;
   said first remote computing device being further effective for selecting, from said print-file list, at least one stored print-job file as a target print-job file and for downloading said target print-job file over the internet.

2. The internet printing system of claim 1, wherein:
   a plurality of said registered printing devices are arranged into printer-groups, each printer-group being associated with a corresponding one of said ID codes, and each registered printing device within a particular printer-group being thereby associated with the particular printer-group's corresponding ID code;

wherein pre-specified print-job files are correlated to respective printer-groups.

3. The internet printing system of claim 2, wherein:
said access code correlates to an ID code associated with a target printer-group; and
said print-job list includes print-job files associated with said target printer-group.

4. The internet printing system of claim 2, wherein:
each print-job file that is correlated to a specific printer-group is also correlated to each registered printing device within said specific printer-group;
said access code correlates to an ID code associated with a target registered printing device; and
said print-file list includes print-jobs files correlated to said target registered printing device and includes print-job files correlated to all the printer-groups to which said target registered printing device belongs.

5. The internet printing system of claim 1, wherein each ID code is associated with a single one of said registered printing devices and said print-file list includes only print-jobs correlated to the single registered printing device associated with said target ID code.

6. The internet printing system of claim 1, wherein:
said print-job files are indirectly correlated to respective registered printing devices by being primarily associated to the same ID code as the respective registered printing devices; and
said print-file list includes print-file files associated with the ID code identified by said access code.

7. The internet printing system of claim 1, wherein said print-job files within said data storage unit are in the form of one of a journal file and a printer-driver-processed file, where said journal file includes device driver requests generic to a plurality of printing devices, and said printer-driver-processed file includes drive data specific to a pre-defined printing device model.

8. The internet printing system of claim 7, wherein if said target print-job file is in the form of a printer-driver-processed file, said first computing device identifies the printing device model specific to the printer-driver-processed file, and downloads said target print-job file only if said first remote computing device determines that it is capable of printing said target print-job file.

9. The internet printing system of claim 8, wherein said first computing device is one of said registered printing devices.

10. The internet printing system of claim 8, wherein said first computing device is a general purpose computer having direct access to a local printing device that is one of said registered printing devices, and conveys said target print-job to said local printer.

11. The internet printing system of claim 7, wherein if said target print-job file is in the form of a journal file, said first remote computing device identifies at least one printing device model generic to said journal file, and said network server processes said journal file using the printer driver software for the identified printing device model to produce a post-printer-driver file for download by said first computing device.

12. The internet printing system of claim 7, wherein said first remote computing device is one of said registered printing devices, and identifies itself as said identified printing device model.

13. The internet printing system of claim 12, wherein said first remote printing device has direct access to the internet.

14. The internet printing system of claim 11, wherein said first remote computing device has direct access to at least one local printer, and identifies said at least one local printer as said identified printing device model.

15. The internet printing system of claim 1, wherein said first computing device is asked to accept a periodic subscription fee for continued access to said network server.

16. The internet printing system of claim 1, wherein said network server requests that said first remote computing device accept a printing-fee for each print-job file downloaded.

17. The internet printing system of claim 1, wherein said network server marks said target print-job file as being downloaded following the downloading of said target print-job file by said first remote computing device.

18. The internet printing system of claim 1 further having:
a second remote computing device for accessing said network server over the internet, and submitting an identification code sequence to said network server;
said network server responding to the submission of said identification code sequence correlating with a pre-defined ID within said ID-record by providing said second remote computing device with a selection list of registered printing devices from among said printer-record that are associated with said predefined ID;
said second remote computing device being further effective for selecting at least one registered printing device from within said selection list and for uploading a new print-job file to said network server for storage within said data storage unit, whereupon said network servers associates said new print-job file with each selected printing device.

19. The internet printing system of claim 18 wherein said network server maintains the printer driver software for said at least one target printing device, and said uploaded print-job file is in the form of a journal file having device driver requests generic to said target printing device, and said network server uses said printer driver software to convert said journal file into a printer-driver-processed file specific to said target printing device.

20. The internet printing system of claim 18 wherein:
at least a group of said registered printing devices are arranged into printer-groups individually associated with selected ones of said ID codes; and
said selection list includes printer-groups associated with said identification code sequence, and wherein when a target printer-group within said selection list is selected for associating with said new print-job file, the registered printing devices included within said target printer-group are automatically associated with said new print-job file.

21. The internet printing system of claim 20 wherein each registered remote printing device may be associated with more than one of said printer-groups.

22. The internet printing system of claim 18 wherein:
at least some of said registered printing devices are arranged into printer-groups individually associated with selected ones of said ID codes;
said submitted identification code sequence identifies a targeted one of said printer-groups; and
said printer-list includes only printers associated with said targeted printer-group.

23. The internet printing system of claim 22 wherein:
said second remote computing device is further permitted to choose whether to associated the uploaded print-job file with said targeted printer-group or with at least one individual remote printing device within said targeted printer-group;

and
if said second computing device chooses to associate the uploaded print-job file with said targeted printer-group, then said network server automatically associates the uploaded print-job file with all registered printing devices within said targeted printer-group, and if said computing device chooses to associate the uploaded print-job file with an individually selected remote printing device within said targeted printer-group, then said network server associates the uploaded print-job file with only the individually selected remote printing device.

24. The internet printing system of claim 22 wherein each registered remote printing device may be associated with more than one of said printer-groups.

25. The internet printing system of claim 18 wherein:
said network server maintains a user-record of registered users, and
said ID codes are passwords for identifying each registered user.

26. The internet printing system of claim 25 wherein:
each registered user has printing permission access to each registered printing device associated with the registered user's ID code;
said network server maintains one of an owner status and a user status association between each registered user and the registered printing devices to which each registered user has printing permission access;
registered users having owner status to a specific printing device may grant, or remove, printing permission access to other users not having owner status to said specific printing device; and
registered users having user status to said specific printing device may not alter the printing access permission of other registered users to said specific printing device.

27. The internet printing system of claim 26 wherein:
at least one registered user having owner status to said specific printing device is further categorized as having super-owner status to said specific printing device;
the registered user having super-owner status may assign said identified registered user one of said owner status and user status, the registered user having super-owner status being further permitted to remove owner status printing permission and user status printing permission from all other registered users not having said super-owner status associated with said specific printing device; and
any registered user that has owner status but does not have said super-owner status may assign said identified registered user only said user status.

28. The internet printing system of claim 26 wherein:
said second remote computing device is further effective for submitting to said network server user-registration information for adding a new registered user to said user-record, said user-registration information including at least one of said new user s name, telephone number, and mailing address; said
network server further permitting said second remote computing device to submit printer-registration information for a new printing device to be added to said printer-record after said new user is registered, wherein said new printing device is not locally accessible by said network server and said printer-registration information includes descriptive data including at least one of said new printing device's model name, printing capabilities, physical location address, and printer driver software.

29. The internet printing system of claim 28 wherein upon submission of said printer-registration information for said new printing device, said network server grants said new registered user owner status to said new printing device.

30. The internet printing system of claim 1, wherein said first remote computing device downloads said print job using HTTP internet protocol communication.

* * * * *

UNITED STATES PATENT AND TRADEMARK OFFICE
CERTIFICATE OF CORRECTION

PATENT NO. : 7,359,076 B2  
APPLICATION NO. : 10/404385  
DATED : April 15, 2008  
INVENTOR(S) : Atsushi Uchino Page 1 of 1

It is certified that error appears in the above-identified patent and that said Letters Patent is hereby corrected as shown below:

<u>Column 21</u>

Line 60, please change "of claim 7" to --of claim 11--.

Signed and Sealed this

Seventeenth Day of February, 2009

JOHN DOLL  
*Acting Director of the United States Patent and Trademark Office*